(12) United States Patent
Mathur

(10) Patent No.: US 9,359,974 B2
(45) Date of Patent: Jun. 7, 2016

(54) HIGH PERFORMANCE LIQUID ROCKET PROPELLANT

(71) Applicant: Johann Haltermann Limited, Houston, TX (US)

(72) Inventor: Indresh Mathur, Sugar Land, TX (US)

(73) Assignee: Johann Haltermann Limited, Houston, TX (US)

( * ) Notice: Subject to any disclaimer, the term of this patent is extended or adjusted under 35 U.S.C. 154(b) by 50 days.

(21) Appl. No.: 14/224,214

(22) Filed: Mar. 25, 2014

(65) Prior Publication Data

US 2014/0202132 A1    Jul. 24, 2014

Related U.S. Application Data

(62) Division of application No. 13/670,776, filed on Nov. 7, 2012, now Pat. No. 9,005,380.

(60) Provisional application No. 61/615,088, filed on Mar. 23, 2012.

(51) Int. Cl.
| | |
|---|---|
| *C06B 47/02* | (2006.01) |
| *F02K 9/42* | (2006.01) |
| *C10L 1/04* | (2006.01) |
| *C06B 25/20* | (2006.01) |
| *C10G 35/095* | (2006.01) |

(52) U.S. Cl.
CPC . *F02K 9/42* (2013.01); *C06B 25/20* (2013.01); *C10G 35/095* (2013.01); *C10L 1/04* (2013.01); *C10G 2300/301* (2013.01); *C10G 2400/08* (2013.01)

(58) Field of Classification Search
CPC .................................. C06B 47/02; F02K 9/42
See application file for complete search history.

(56) References Cited

U.S. PATENT DOCUMENTS

| | | | |
|---|---|---|---|
| 6,458,265 | B1 | 10/2002 | Miller et al. |
| 2002/0173556 | A1 | 11/2002 | Moore, Jr. et al. |
| 2004/0149627 | A1 | 8/2004 | Koide et al. |
| 2006/0111599 | A1 | 5/2006 | Lamprecht et al. |
| 2006/0122442 | A1 | 6/2006 | Kohler et al. |
| 2006/0199988 | A1 | 9/2006 | Kowalik et al. |
| 2007/0205137 | A1 | 9/2007 | Clark et al. |
| 2009/0299109 | A1 | 12/2009 | Gruber et al. |
| 2010/0218417 | A1* | 9/2010 | Bauldreay et al. .............. 44/438 |

FOREIGN PATENT DOCUMENTS

EP    2338865 A1    6/2011

OTHER PUBLICATIONS

Form PCT/ISA/220 International Search Report PCT and Form PCT/ISA/237 Written Opinion, Application No. PCT/US2013/033691, dated Jan. 31, 2014.
European Patent Office communication (Supplemental Partial European Search Report) dated Feb. 25, 2015, 7 pages.

* cited by examiner

*Primary Examiner* — Aileen B Felton
(74) *Attorney, Agent, or Firm* — Butzel Long

(57) ABSTRACT

Disclosed is a process of fueling a rocket engine or air-breathing engine for a hypersonic vehicle with a high performance hydrocarbon fuel characterized by a hydrogen content greater than 14.3% by weight, a hydrogen to carbon atomic ratio greater than 2.0 and/or a heat of combustion greater than 18.7 KBtu/lb. The disclosed fuels generally have a paraffin content that is at least 90% by mass and a $C_{12}$-$C_{20}$ isoparaffin content of at least 40% by mass.

9 Claims, No Drawings

HIGH PERFORMANCE LIQUID ROCKET PROPELLANT

CROSS-REFERENCE TO RELATED APPLICATIONS

This application is a division of application Ser. No. 13/670,776, filed Nov. 7, 2012, claiming priority to U.S. Provisional Application No. 61/615,088, filed Mar. 23, 2012, which are incorporated herein by reference in their entirety.

FIELD OF THE DISCLOSURE

The present disclosure relates generally to high performance liquid propellants, and more particularly to high performance liquid propellants suitable for use in rockets and hypersonic vehicles having air breathing engines.

BACKGROUND

Liquid fuel as a propellant for rockets has been used to provide the required thrust for many years. Liquid propellants have an advantage over solid propellants because the engine can be started and stopped by controlling the fuel flow to the combustor. In the liquid-fueled rocket engine, the fuel is burned in a fuel rich environment with an oxidant, usually liquid oxygen (LOX), to provide thrust generated by high speed ejection of exhaust gases. In a rocket application, the fuel may be subjected to high environmental temperatures such as when the fuel is used as a coolant prior to combustion, and may decompose resulting in unwanted deposits, gums, foulants or the like. Therefore, the fuels used as rocket propellants should exhibit good thermal stability.

An improvement in thermal stability as compared with more conventional fuels (e.g., RP-1) is particularly important for fuels that are intended for use with reusable rocket engines and in air breathing hypersonic vehicles that employ the fuel as a coolant to help reduce the high temperatures of airframe structures and engine components that are developed during hypersonic flight. The term "air breathing" refers to a vehicle having an engine that is configured to receive air from the atmosphere to be used in combustion of a fuel, and encompasses vehicles having various jet engines, such as ramjets, scramjets, etc.

The specific impulse ($I_{sp}$) is a performance measure for rocket propellants that is equal to units of thrust produced during ejection of exhaust gases from a rocket engine per unit weight of propellant consumed per unit of time, and therefore specific impulse is measured in units of time (e.g., seconds). $I_{sp}$ can be used to determine the payload that a rocket can carry into orbit. Propellants with a higher specific impulse are desirable in order to deliver a payload into a desired orbit at a minimum cost. It is also desirable that the fuel burns or combusts cleanly and does not form deposits when a portion of the fuel is used for driving a turbine to operate a pump to deliver the fuel to the rocket engine.

Rocket scientists have determined that the specific impulse can be calculated from the equation:

$$I_{sp} = 9.80 \sqrt{\frac{T_c}{M}} \sqrt{\frac{k}{k-1}} \sqrt{1 - \left(\frac{P_e}{P_o}\right)^{\frac{k-1}{k}}}$$

Where,
M=a weighted average of the molecular weights of the combustion products
$T_c$ is the combustion chamber temperature in degrees Rankine
$k=C_p/C_v$ is the ratio of specific heats of the combustion products
$P_e/P_o$=ratio of external pressure to combustion chamber pressure Therefore, to achieve highest $I_{sp}$ it is desirable to have a high combustion temperature (high net heat of combustion) and have combustion products with a lowest possible molecular weight. For example, maximum $I_{sp}$ for any liquid propellant is provided by liquid hydrogen fuel, with oxygen as oxidant, because the product of combustion is only water (M=18). In contrast, a hydrocarbon fuel results in combustion products comprising $CO_2$ (M=44), CO (M=28) and water. Therefore, to maximize $I_{sp}$, the hydrocarbon fuel must have a high hydrogen content (i.e. a high H/C atomic ratio) and it must burn such that $CO_2$ formation and unburned hydrocarbons are minimized. To minimize $CO_2$ generation and maximize carbon monoxide generation, the rocket engine is designed to combust the fuel under fuel rich conditions.

The disclosed formulations are capable of producing a higher $I_{sp}$ than that provided by a conventional petroleum based refined kerosene called RP-1. The RP-1 specifications were developed for military purposes as MIL-P25576 in 1957 and set a broad criterion for propellant properties with higher density, cleaner burning, ease of handling and performance relative to kerosene jet fuel. Commercially available RP-1 fuels are limited to a hydrogen content of about 14 wt. %, a hydrogen to carbon atomic ratio (H/C) less than 2.0, a heat of combustion less than 18.7 KBtu/lb and can have up to 5 percent by volume aromatics and 2 percent by volume olefins. This conventional RP-1 fuel can also contain up to 30 ppm (weight basis) sulfur. The aromatics and olefins can cause deposits and coke formation in the cooling chambers and sulfur can cause rapid corrosion.

Previously, cycloalkanes, such as 1,2-diethylcyclohexane (DECH), which have optimum density and combustion properties, were added to refined kerosene to produce a rocket propellant. However, DECH has a molecular formula of $C_{10}H_{20}$ with a density of about 0.80 g/cm³ while only having an H/C atomic ratio of 2.0. Therefore, addition of DECH to conventional RP-1 does not provide a great improvement. Further, DECH is not readily available in large quantities. Substituted cycloalkanes are also believed to produce combustion chamber products with a higher molecular weight than the breakdown products from isoparaffins.

SUMMARY OF THE DISCLOSURE

Disclosed are high performance liquid hydrocarbon fuels suitable for use in rocket engines, including those used for defense and space exploration. The disclosed high performance fuels are also applicable to the aviation industry, such as for use with air breathing hypersonic vehicles. Also disclosed are methods for formulating high specific impulse liquid fuels.

In accordance with certain embodiments, a hydrocarbon fuel having a hydrogen content greater than 14.3% on a weight (mass) basis are provided, e.g., greater than 14.5% or 15% by mass.

In certain embodiments, the hydrocarbon fuel has a hydrogen to carbon atomic ratio greater than 2.0 (e.g., greater than 2.05 or greater than 2.1).

In certain embodiments, the hydrocarbon fuel has a heat of combustion greater than 18.7 KBtu/lb (e.g., greater than 18.8 KBtu/lb or greater than 18.9 KBtu/lb).

In certain embodiments, the hydrocarbon fuel has a total paraffin content that is at least 90% by mass (e.g., at least 95% by mass or at least 99% by mass), and an isoparaffin content that is at least 40% by mass (e.g., at least 50% by mass, at least 60% by mass, at least 70% by mass, or at least 75% by mass).

In certain embodiments, the hydrocarbon fuel is a blend of an isoparaffin and a highly paraffinic kerosene.

In certain exemplary embodiments, the isoparaffin blended with the kerosene is comprised of at least one isododecane, at least one isohexadecane, at least one isoeicosane, or mixture of these.

In certain other embodiments, the hydrocarbon fuel is a blend of an isoparaffin and a naphthenic kerosene.

In certain embodiments, the fuel is used as a propellant in a vehicle having a rocket engine.

In certain embodiments, branched alkanes (isoparaffins) are blended with other base fuels to improve the performance characteristics of the base fuel (e.g., fuel density, heat of combustion, specific impulse and deposit forming properties during catalytically induced endothermic pyrolytic decomposition for cooling applications).

Other features and advantages of the present disclosure will become readily appreciated as the same becomes better understood after reading the following description.

DESCRIPTION

Formulations for high energy rocket fuels containing highly branched paraffinic (i.e., isoparaffinic) chemical components, used individually or in combination with each other or in combination with highly paraffinic refined kerosene or in combination with commercially available RP-1 fuel, are described herein. The hydrogen content and H/C atomic ratio of the new fuel is higher than conventional RP-1 fuel resulting in a greater heat of combustion. The sulfur, aromatics and olefin contents of these propellants are also lower, since these components are more susceptible to degradation in typical rocket propulsion application environments. The net impact being that the novel formulations disclosed herein produce a significantly better propellant than conventional RP-1 fuel for certain rocket and air breathing hypersonic vehicle applications. Advantageously, the fuel disclosed herein burns smoke free. The lower density of the isoparaffin material may require an increased volume of the fuel in the rocket, or the addition of higher density fuel components.

The fuels disclosed herein comprise isoparaffins, such as isododecane, isohexadecane, isoeicosane, and/or highly refined and very paraffinic kerosene streams with a high isoparaffin content. These components can be used individually or in combination with each other. These components inherently have or can be selected to have a very low sulfur content, such that they can be combined with conventional fuels (e.g., RP-1 fuel) and/or other fuel components to provide a high performance liquid fuel that has a sulfur content that is substantially lower than that of conventional hydrocarbon liquid fuels.

The isoparaffins have a high hydrogen content and provide a higher H/C atomic ratio, higher heat of combustion, burn faster and cleaner, are easier to handle and exhibit improved $I_{sp}$ as compared with conventional RP-1 fuel. It is expected that the branched paraffinic character of these fuels will provide exhaust gases with a lower molecular weight than conventional RP-1 fuel. It is believed that the more highly branched paraffins provide a higher heat of combustion than their linear isomers or more lightly branched paraffin isomers. Lower molecular weight isoparaffins provide a higher hydrogen content and H/C atomic ratio, and therefore provide exhaust products with lower average molecular weight and thus higher specific impulse, while higher molecular weight isoparaffins provide higher energy density. It is believed that the use of isoparaffins having from about 12 to about 24 carbon atoms is desirable, and that compositions comprising at least 50% isoparaffins having from 12 to 20 carbon atoms by weight are useful for achieving a combination of improved specific impulse and energy density. Such fuels typically have a boiling point range of at least 100° F., and can have a boiling point range greater than 130° F., 135° F. or 140° F. Desirably, the new fuels disclosed herein have a density (specific gravity) that is at least 0.76 or at least 0.77.

The fuels disclosed herein are characterized by having a high isoparaffin content, hydrogen content, H/C atomic ratio and heat of combustion. Conventional RP-1 fuels are limited to a hydrogen content of about 14 wt. %, an H/C atomic ratio less than 2.0, a net heat of combustion of less than 18.7 KBtu/lb. The fuel components that can be substituted for conventional RP-1 fuel, can be used singly or in combination with one another; and have a hydrogen content, H/C atomic ratio, and heat of combustion values that are superior to conventional RP-1 fuels. The resulting novel fuels may have a hydrogen content greater than 14.3 percent by mass, and/or a net heat of combustion greater than 18.7 KBtu/lb. For example, the hydrogen content can be greater than 14.5 percent by mass, or even greater than 15 percent by mass. As another example, the net heat of combustion can be greater than 18.8 KBtu/lb, or even greater than 18.9 KBtu/lb. The H/C atomic ratio can be greater than 2.0, greater than 2.05, and even greater than 2.10.

Because of the high isoparaffin content of the fuels disclosed herein, these fuels typically have a low cycloparaffin content as compared with conventional RP-1 fuel. For example a conventional RP-1 fuel has about 62% cycloparaffins by mass, whereas, the new fuels described herein typically comprise less than 25% cycloparaffins by mass, and even less than 20% or 15% cycloparaffins by mass.

In one example, an isododecane comprised of mostly 2,2,4,6,6-pentamethylheptane has a density (specific gravity) of about 0.75 g/cm$^3$. This component with a formula of $C_{12}H_{26}$ was found to have a net heat of combustion of 18,964 Btu/lb. and a hydrogen content of 15.1 wt. % which equates to H/C atomic ratio of 2.13.

In another example, an isohexadecane comprised of mostly 2,2,4,4,6,8,8-heptamethylnonane (HMN) has a density (specific gravity) of about 0.79 g/cm$^3$. This component with a formula of $C_{16}H_{34}$ was found to have a net heat of combustion of 18964 Btu/lb. and had a hydrogen content of 14.9 wt. % which equates to a H/C atomic ratio of 2.10.

In another example, an isoeicosane having a density of 0.8179 g/cm$^3$ has a formula of $C_{20}H_{42}$ and is expected to have a hydrogen content of 14.89 wt. %, H/C atomic ratio of 2.10 and a high heat of combustion.

Refined kerosenes for formulating the fuels disclosed herein are typically highly paraffinic and have a high isoparaffinic content with some naphthenic content and little or no aromatics. For example, a highly refined stream derived from a highly paraffinic crude had a hydrogen content of 14.7 percent by weight, H/C atomic ratio of 2.06 and a net heat of combustion of 18,852 Btu/lb. A "highly isoparaffinic kerosene" refers to a kerosene comprising at least 50% isoparaffins by weight.

In another example, if the density of the fuel formulated using the components identified above is less than optimum, a more naphthenic kerosene can be added to increase the density of the blended fuel at a slight detriment to H/C atomic ratio value. One such naphthenic kerosene was found to have 13.9% hydrogen, an H/C atomic ratio of 1.94 and a heat of combustion of 18,641 Btu/lb. This naphthenic kerosene had only 21.9 percent by volume isoparaffins and normal-paraffins, and about 77 percent by volume naphthenic components. A naphthenic kerosene is a kerosene comprised primarily (at least 50 percent by mass) of naphthenic compounds (i.e., cycloalkanes having general formula $C_m H_{2(m+1-r)}$, where m is the number of carbon atoms and r is the number of rings in the cycloalkane).

As another alternative, small amounts of 1,2-diethylcyclohexane (DECH) may be added to highly isoparaffinic compositions in amounts sufficient to provide blends having a higher mass density, and therefore a higher energy density, without unacceptably reducing the heat of combustion.

Rocket fuels having a higher H/C atomic ratio than conventional RP-1 fuels can also be formulated by the addition of isododecane, isohexadecane and isoeicosane to refined kerosenes.

In Table 1, the physical properties of two examples of rocket fuels produced using the formulations described herein (Blend H and Blend G1) are compared with an RP-1 fuel produced to MIL-P25576 requirements.

TABLE 1

New Rocket Propellant Compared with Typical RP-1
HF0824

| TEST | METHOD | UNITS | RESULTS Blend H | RESULTS Blend G1 | RESULTS Typical RP-1 |
|---|---|---|---|---|---|
| Distillation - IBP | ASTM D86 | ° F. | 344.6 | 354.2 | 367.9 |
| 5% | | ° F. | 354.0 | 373.6 | 383.0 |
| 10% | | ° F. | 356.0 | 377.6 | 386.3 |
| 20% | | ° F. | 359.4 | 384.2 | 393.5 |
| 30% | | ° F. | 363.7 | 393.4 | 399.4 |
| 40% | | ° F. | 366.0 | 404.3 | 406.8 |
| 50% | | ° F. | 369.8 | 417.6 | 415.3 |
| 60% | | ° F. | 377.3 | 435.7 | 424.5 |
| 70% | | ° F. | 391.5 | 451.6 | 435.0 |
| 80% | | ° F. | 423.7 | 465.7 | 448.6 |
| 90% | | ° F. | 462.7 | 470.7 | 467.5 |
| 95% | | ° F. | 472.7 | 478.2 | 483.4 |
| Distillation - EP | | ° F. | 485.0 | 490.3 | 506.5 |
| Recovery | | vol % | 97.8 | 98.0 | 98.3 |
| Residue | | vol % | 1.2 | 1.2 | 1.4 |
| Loss | | vol % | 1.0 | 0.8 | 0.3 |
| Gravity | ASTM D4052 | ° API | 54.70 | 51.9 | 42.8 |
| Specific Gravity | ASTM D4052 | — | 0.7600 | 0.7713 | 0.8120 |
| Flash Point | ASTM D93 | ° F. | 133 | 149 | 144 |
| Freeze point | ASTM D2386 | ° F. | <−81 | −44 | <−94 |
| Hydrogen | ASTM D3343 | wt % | 15.06 | 15.07 | 14.29 |
| Sulfur | ASTM D5453 | mg/kg | <1 | 2.4 | <1 |
| Mercaptan sulfur | ASTM D3227 | mg/kg | <3 | <3 | <3 |
| Composition, aromatics | ASTM D1319 | vol % | <5 | <5 | <5 |
| Composition, olefins | ASTM D1319 | vol % | <0.3 | 0.4 | 0.4 |
| Existent gum, washed | ASTM D381 | mg/100 mls | <1 | <1 | <1 |
| Particulate contaminant | ASTM D5452 | mg/l | na | na | 0.37 |
| Viscosity @−30° C. | ASTM D445 | cSt | 6.866 | 9.138 | 9.645 |
| Corrosion, Copper | ASTM D130 | — | 1a | 1a | 1a |
| Water React Rating | ASTM D1094 | — | 1 | 1b | 1 |
| Net Heat of Combustion | ASTM D240 | BTU/lb | 18934 | 18871 | 18659 |

TABLE 2

Compositional Analysis Data

| | Blend G1 wt % | HIRK wt % | Typical RP-1 wt % |
|---|---|---|---|
| Alkylbenzenes | | | |
| Benzene | <0.01 | <0.01 | <0.01 |
| Toluene | <0.01 | <0.01 | <0.01 |
| C2-Benzene | <0.01 | <0.01 | <0.01 |
| C3-Benzene | 0.03 | <0.01 | <0.01 |
| C4-Benzene | <0.01 | <0.01 | 0.13 |
| C5-Benzene | <0.01 | <0.01 | 0.02 |
| C6+ Benzenes | 0.14 | <0.01 | <0.01 |
| Total | 0.17 | <0.01 | 0.16 |
| Alkylnaphthalenes | | | |
| Naphthalene | <0.01 | <0.01 | <0.01 |
| C1-Naphthalenes | <0.01 | 0.02 | <0.01 |
| C2-C4 alkyl naphthalenes | 0.02 | 0.04 | <0.01 |
| Total | 0.03 | 0.06 | <0.01 |
| indans and tetralins | 0.07 | 0.12 | 0.25 |
| iso-Paraffins | | | |
| C7 and lower-Iso- | 0.03 | <0.01 | <0.01 |
| C8-Iso- | 0.03 | <0.01 | <0.01 |
| C9-Iso- | <0.01 | <0.01 | 0.02 |
| C10-Iso- | <0.01 | <0.01 | 2.26 |
| C11-Iso- | 0.57 | 0.16 | 6.44 |
| C12-Iso- | 37.05 | 3.15 | 7.89 |

TABLE 2-continued

Compositional Analysis Data

|  | Blend G1 wt % | HIRK wt % | Typical RP-1 wt % |
|---|---|---|---|
| C13-Iso- | 9.57 | 14.68 | 8.15 |
| C14-Iso- | 21.08 | 32.48 | 5.18 |
| C15-Iso- | 8.27 | 12.80 | 3.03 |
| C16-Iso- | 1.22 | 1.89 | 0.71 |
| C17 and greater | 0.22 | 0.34 | 0.27 |
| total isoparaffins | 78.03 | 65.50 | 33.95 |
| n-Paraffins |  |  |  |
| n-C7 | <0.01 | <0.01 | <0.01 |
| n-C8 | <0.01 | <0.01 | <0.01 |
| n-C9 | <0.01 | <0.01 | 0.06 |
| n-C10 | <0.01 | <0.01 | 0.22 |
| n-C11 | 0.23 | 0.35 | 1.54 |
| n-C12 | 1.55 | 2.41 | 1.23 |
| n-C13 | 3.76 | 5.82 | 0.25 |
| n-C14 | 3.81 | 5.93 | 0.28 |
| n-C15 | 0.41 | 0.63 | 0.04 |
| n-C16 | 0.05 | 0.08 | <0.01 |
| total n-paraffins | 9.80 | 15.23 | 3.62 |
| Cycloparaffins |  |  |  |
| Monocycloparaffins | 5.08 | 8.24 | 37.66 |
| Dicycloparaffins | 5.91 | 8.51 | 19.72 |
| Bihexyls | 0.28 | 0.49 | 2.47 |
| Tricycloparaffins | 1.07 | 1.76 | 2.35 |
| total cycloparaffins | 12.33 | 19.00 | 62.20 |
|  | 100 | 100 | 100 |

The compositional analysis of the G1 Fuel listed in Table 1, as determined using a comprehensive gas chromatography technique (also referred to as "GC×GC"), is provided in Table 2, along with the compositional analysis of a highly isoparaffinic refined kerosene ("HIRK") used to prepare the G1 Fuel, and the compositional analysis of the typical RP-1 fuel.

Formulation G1 may be produced by blending 40 percent by volume isododecane with 60 percent by volume of the highly paraffinic kerosene (HIRK) described above.

Formulation H may be produced by blending 70 percent by volume isododecane with 30 percent by volume of a highly paraffinic kerosene described above.

Other suitable formulations generally include hydrocarbon fuels comprising at least 40 percent by mass, at least 50 percent by mass, at least 60 percent by mass, at least 70 percent by mass, or at least 75 percent by mass isoparaffins. Examples include compositions comprising a total paraffin content (iso-paraffins plus n-paraffins plus cycloparaffins) of at least 90 percent, 95 or 99 percent by mass wherein the content of isoparaffins having from 12 to 20 carbon atoms is at least 50 percent, at least 60 percent, at least 70 percent or at least 75 percent by mass, and the cycloparaffin content is less than 35 percent, less than 20 percent, less than 15 percent or less than 10 percent by mass. Isoparaffins and normal-paraffins are hydrocarbons (molecules comprised of only hydrogen and carbon) having general formula $C_nH_{2n+2}$, where n is a positive integer. The term "isoparaffin" encompasses paraffins that are branched (i.e. paraffins in which at least one carbon atom is bonded to at least three other carbon atoms).

Blends G1 and H are superior to the RP-1 shown in Table 1 except that densities of blends G1 and H are slightly lower. Blends with higher densities can be formulated by adding isohexadecane and or isoeicosane, which have high densities, high H/C atomic ratio and high heats of combustion. For example, the densities of fuels G1 and H can be increased by addition of isoeicosane without significantly sacrificing H/C atomic ratio or heat of combustion.

Substituted monocyclic or bicyclic paraffins such as 1,2-diethylcyclohexane (DECH) or bicyclodecane (also known as decalin) may also be employed in amounts sufficient to increase mass and energy densities without significantly or undesirably reducing the heat of combustion of the fuels.

The disclosed novel liquid fuels are better than conventional RP-1 fuels because they have a higher hydrogen content, a higher H/C atomic ratio, and a higher heat of combustion, with little or no aromatics, olefin or sulfur. Therefore, these fuels provide a higher $I_{sp}$ with minimum corrosion or coking and plugging of the cooling chambers and exhaust nozzle.

Additionally, the fuels described herein are believed to be well suited for applications in which the fuel is caused to flow through microchannels having walls coated with a catalyst for inducing endothermic pyrolytic decomposition to cool engine components or airframe structures of rockets or air breathing hypersonic vehicles. In such applications, it may be desirable to employ a separation process for removing trace amounts of oxygen-containing compounds such as ketones, aldehydes or alcohols, such as by passing the fuel through a sorption bed that comprises a material that selectively adsorbs or absorbs oxygen-containing (polar) compounds. It is believed that amounts of oxygen-containing compounds in the fuel as low as about 200 to 300 ppm (weight) can cause fouling during endothermic pyrolytic decomposition of the fuel, causing overheating and potentially catastrophic failure of engine and/or airframe components. The separation process that may be employed can reduce the amount of oxygen-containing compounds in the fuel composition to less than 200 ppm (weight), less than 100 ppm (weight), or even less then 50 ppm (weight).

The described embodiments are not limiting. Various modifications are considered within the purview and scope of the appended claims.

What is claimed is:

1. A process of fueling a rocket engine or an air breathing engine of a hypersonic vehicle comprising:
   introducing to the engine a hydrocarbon fuel having a hydrogen content greater than 14.3% on a mass basis, an aromatics content of less than 5% by volume, a sulfur content of less than 30 ppm by mass, and wherein the hydrocarbon fuel is a blend of an isoparaffin and a refined kerosene.

2. The process of claim 1, in which the hydrocarbon fuel has a range of components that provide a boiling point range of at least 100° F.

3. The process of claim 1, in which the hydrocarbon fuel has a net heat of combustion greater than 18.7 KBtu/lb.

4. The process of claim 1 in which the kerosene is a highly paraffinic refined kerosene.

5. The: process of claim 1, in which the isoparaffin is comprised of at least one isododecane, at least one isohexadecane, at least one isoeicosane, or a mixture of these.

6. A process of fueling a rocket engine or an air breathing engine of a hypersonic vehicle comprising:
   introducing to the engine a hydrocarbon fuel having a range of components that provide a boiling point range of at least 100° F., and having a hydrogen content greater than 14.3% on a mass basis, an aromatics content of less than 5% by volume, and wherein the hydrocarbon fuel is a blend of an isopareffin and a refined kerosene.

7. The process of claim 6, in which the hydrocarbon fuel has a net heat of combustion greater than 18.7 KBtu/lb.

8. The process of claim 6, in which the kerosene is a highly paraffinic refined kerosene.

9. The process of claim 6, in which the isoparaffin is comprised of at least one isododecane, at least one isohexadecane, at least one isoeicosane, or a mixture of these.

\* \* \* \* \*